United States Patent
Turner et al.

(10) Patent No.: US 11,502,849 B2
(45) Date of Patent: Nov. 15, 2022

(54) METHOD OF UTILIZING A TRUSTED SECRET PACKAGE FOR CERTIFICATE ENROLLMENT

(71) Applicants: MOTOROLA SOLUTIONS, INC., Chicago, IL (US); Steven K Turner, Cary, IL (US); Andrzej Grzesik, Jaworzno (PL); Chris A. Kruegel, Plainfield, IL (US)

(72) Inventors: Steven K Turner, Cary, IL (US); Andrzej Grzesik, Jaworzno (PL); Chris A. Kruegel, Plainfield, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 85 days.

(21) Appl. No.: 16/768,088

(22) PCT Filed: Feb. 28, 2018

(86) PCT No.: PCT/PL2018/050007
§ 371 (c)(1),
(2) Date: May 29, 2020

(87) PCT Pub. No.: WO2019/168419
PCT Pub. Date: Sep. 6, 2019

(65) Prior Publication Data
US 2020/0396610 A1 Dec. 17, 2020

(51) Int. Cl.
*H04L 29/06* (2006.01)
*H04L 9/32* (2006.01)
(Continued)

(52) U.S. Cl.
CPC .......... *H04L 9/3247* (2013.01); *G06K 7/1417* (2013.01); *H04L 9/006* (2013.01);
(Continued)

(58) Field of Classification Search
CPC .. H04W 12/069; H04W 12/77; G06K 7/1417; H04L 9/006; H04L 9/3247;
(Continued)

(56) References Cited

U.S. PATENT DOCUMENTS 6,148,203 A * 11/2000 Renko .................. H04W 48/16
455/434
8,887,262 B1 * 11/2014 Turner .................. H04W 12/06
726/10
(Continued)

FOREIGN PATENT DOCUMENTS

CN 103295341 A * 9/2013 ............. G06Q 20/10
CN 103959831 A * 7/2014 ......... H04L 63/0428
(Continued)

OTHER PUBLICATIONS

The International Search Report and the Written Opinion corresponding patent application No. PCT/PL2018/050007 filed Feb. 28, 2018, all pages.

*Primary Examiner* — Sher A Khan
(74) *Attorney, Agent, or Firm* — Raguraman Kumaresan

(57) ABSTRACT

A mobile device and method are provided that allow for registering the mobile device using a machine readable optical label. The mobile device receives a machine readable optical label, such as a QR code or a bar code. The machine readable optical label includes authentication data and security information. The mobile device scans machine readable optical label to read the authentication data and the security information. The mobile device validates the machine readable optical label and generates certificate request, the certificate request digitally signed using the authentication data and the security information. The mobile device transmits the certificate signing request to a registration authority.

16 Claims, 2 Drawing Sheets

(51) Int. Cl.
  *G06K 7/14*    (2006.01)
  *H04L 9/00*    (2022.01)
  *H04L 9/40*    (2022.01)
  *H04W 12/069*  (2021.01)

(52) U.S. Cl.
  CPC ........ H04L 9/3268 (2013.01); H04L 63/0861 (2013.01); H04W 12/069 (2021.01)

(58) Field of Classification Search
  CPC ............... H04L 9/3268; H04L 63/0861; H04L 63/0823; G06F 2221/2111
  See application file for complete search history.

(56) References Cited

U.S. PATENT DOCUMENTS

| | | | |
|---|---|---|---|
| 9,401,895 B2 | 7/2016 | Herberg et al. | |
| 9,917,911 B2* | 3/2018 | Lee | H04L 67/55 |
| 11,288,643 B2* | 3/2022 | Dallenbach | G06Q 20/36 |
| 2003/0115475 A1 | 6/2003 | Russo et al. | |
| 2004/0255037 A1* | 12/2004 | Corvari | H04L 9/3263 709/201 |
| 2006/0002556 A1* | 1/2006 | Paul | H04L 63/0823 380/270 |
| 2009/0187980 A1* | 7/2009 | Tung | H04L 63/0823 726/10 |
| 2010/0312703 A1* | 12/2010 | Kulpati | G06Q 20/32 705/44 |
| 2011/0158411 A1* | 6/2011 | Medvinsky | H04L 63/06 380/279 |
| 2011/0210171 A1* | 9/2011 | Brown | H04L 63/083 235/382 |
| 2014/0047560 A1* | 2/2014 | Meyer | G06F 21/10 726/28 |
| 2015/0304309 A1* | 10/2015 | Verma | H04L 9/3263 713/156 |
| 2015/0319142 A1* | 11/2015 | Herberg | H04L 63/0428 713/171 |
| 2016/0036788 A1* | 2/2016 | Conrad | H04W 12/06 713/168 |
| 2017/0013087 A1* | 1/2017 | Elkin | G06K 7/1417 |
| 2018/0247298 A1* | 8/2018 | Khan | G06Q 20/206 |
| 2018/0278473 A1* | 9/2018 | Zhou | H04W 12/0471 |
| 2019/0205865 A1* | 7/2019 | Jamkhedkar | G06K 19/06037 |

FOREIGN PATENT DOCUMENTS

| | | | | |
|---|---|---|---|---|
| CN | 107295000 A | * | 10/2017 | ......... H04L 63/0823 |
| CN | 108431698 A | * | 8/2018 | ............ G03H 1/0011 |
| EP | 2722001 A1 | * | 4/2014 | ............ A61B 5/04842 |
| WO | WO-2016130739 A1 | * | 8/2016 | ............. G06Q 20/10 |
| WO | WO-2019168419 A1 | * | 9/2019 | ........... G06K 7/1417 |

* cited by examiner though not limited to this example the specification is written for US 11,502,849 B2.

METHOD OF UTILIZING A TRUSTED SECRET PACKAGE FOR CERTIFICATE ENROLLMENT

BACKGROUND OF THE INVENTION

Customers who purchase mobile devices typically are required to enter information into a website and also download software before the mobile device will become operational. This process is time-consuming, and manual data entry introduces the possibility of data entry errors, which leads to much longer delays in getting the mobile devices operational.

Mobile devices are often shipped with installation instructions and codes that are required in order to make the mobile device operational. Unfortunately, if the box including the mobile device, the instructions, and the installation codes is stolen, the thief has all the equipment and information needed to make the mobile device operational.

Therefore, a need exists for a method of making new mobile devices operational while ensuring that stolen mobile devices are not allowed to function.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
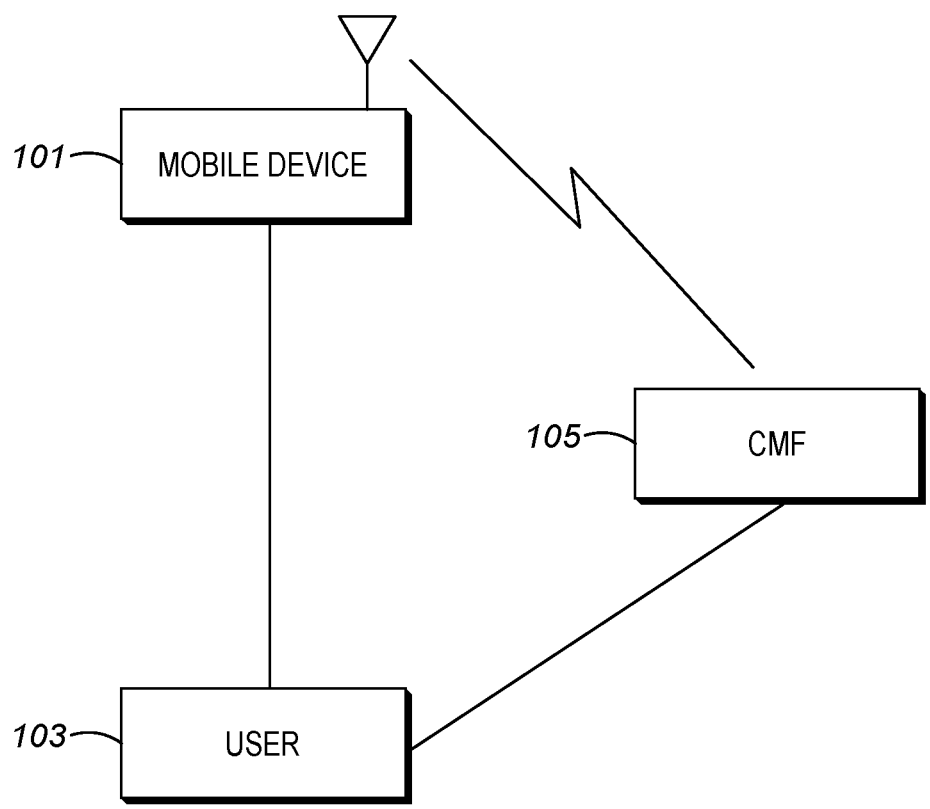
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment improves the security and decreases the opportunity for human error during the installation process of a mobile device. By using biometric information of the user performing device installation procedures and geographic information of the device being installed, the installation and programming of devices is made more efficient and more secure.

FIG. 1 depicts a system diagram of a communication system 100 in accordance with an exemplary embodiment of the present invention. Communication system 100 preferably comprises mobile device 101, user 103, and Certificate Management Function (CMF) 105. In accordance with an exemplary embodiment, a security enrollment package of data is provided for use in certificate enrollment to provide appropriate security measures as well as enhance the usability of enrolling the device as a trusted device in a PKI (Public Key Infrastructure) domain. The security enrollment package preferably includes a One Time Enrollment Code (OTEC). An OTEC is a one-time use code, which in accordance with an exemplary embodiment is time bound. The OTEC is preferably generated and signed by the Registration Authority (RA) of the PKI domain. The OTEC is preferably the main source of trust during the enrollment of mobile device 101. The enrollment code can alternately be a multi-use code that can be used to install multiple mobile devices.

Mobile device 101 is a telecommunications device. Mobile device 101 can be, for example, a smart phone, a laptop computer, a tablet, a land mobile radio, or any electronic device that can scan a machine readable optical label.

User 103 is a person tasked with receiving mobile devices and performing tasks that allow mobile device 101 to become operational. This can include, for example, installing software, obtaining security keys and certificates, and interfacing with websites or the like to enter information about mobile device 101.

CMF 105 is a Certificate Management Function. CMF 105 is a certificate management function that manages certificate operations in communication system 100. These operations can include, for example, acting as a Registration Authority (RA). An RA is part of a Public Key Infrastructure (PKI) that performs certificate enrollment and update request vetting functions on behalf of a Certificate Authority (CA). CMF 105 preferably creates the security enrollment packages for communications system 101.

Figure 2:
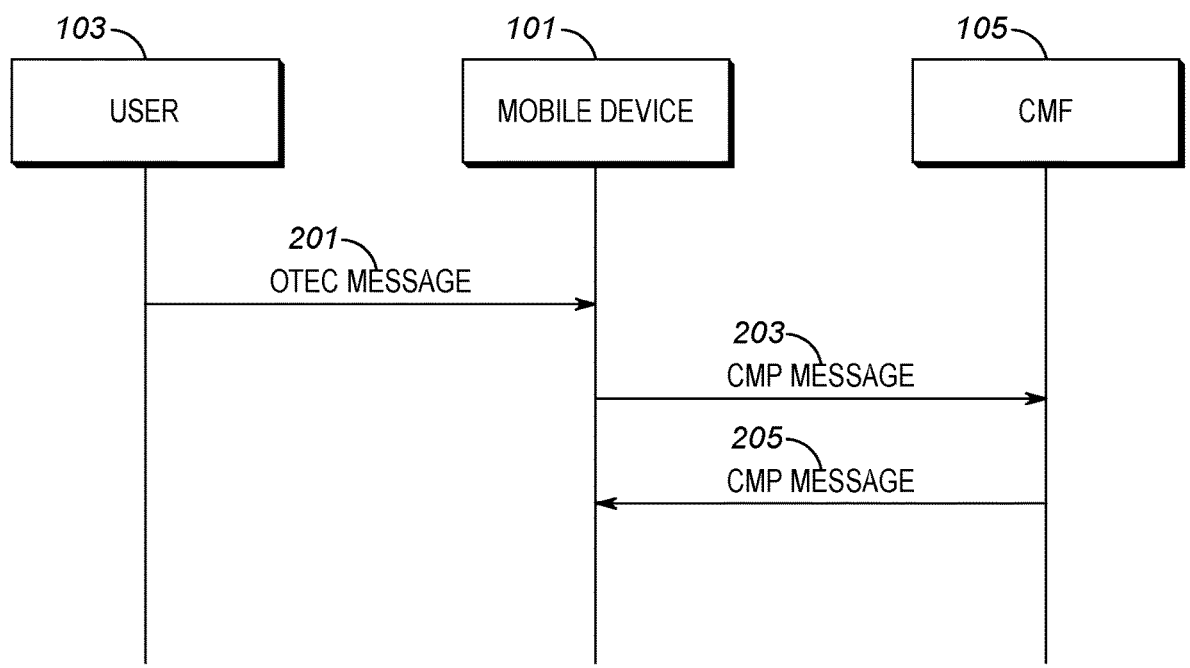
FIG. 2 depicts a call flow in accordance with an exemplary embodiment of the present invention.

FIG. 2 depicts a call flow 200 in accordance with an exemplary embodiment of the present invention. In the exemplary embodiment depicted in FIG. 2, a mobile device, such as a land mobile radio, has been packaged and shipped to a buyer, in this case user 103. In accordance with an exemplary embodiment, the mobile device is included in the package and a machine readable optical label is sent separately to the user doing the installation. This makes the usability of a stolen package much less, since the package does not include the required machine readable optical label. Alternately, the package includes mobile device 101 and the machine readable optical label.

In accordance with an exemplary embodiment, a CMF 105 generates the security enrollment package and includes the data in a machine readable optical label. The Security Enrollment Package preferably includes a version number field, a Checksum field, an OTEC Identifier field, an OTEC value field, an OTEC expiration time field, a Biometric data field, a Geographic location data field, and a Device ID field. The package preferably also includes an indicator for the device to collect biometric data, location data, or any other specified data and include it in the certificate management message sent to CMF 105. Mobile Device 101 preferably uses the indicator to include biometric or location data in the message sent to CMF 105. The biometric or location data can be in the enrollment package and mobile device 101 can use this data locally before deciding to send the CMP message to CMF 105. The OTEC Identifier field preferably includes a list identifier and an item identifier. The Biometric data field is preferably used to restrict who can enroll the device. The Geographic location data field can be used to restrict where enrollments can take place, such as only allowing while the user is installing within a specific geographic area, such as a geofence, which can be helpful if the package with the new mobile device is stolen.

User 103 sends Enrollment Package 201 to Mobile Device 101. This is preferably accomplished by scanning the machine readable optical label. In an exemplary embodiment, the machine readable optical label is a QR (Quick Response) code. Alternately, the machine readable optical label can be a bar code or any other machine readable code that includes data.

Mobile Device 101 preferably verifies the checksum and the expiration time of the OTEC. This ensures that the data has not been corrupted and that the machine readable optical data is not old and out of date.

Once the Mobile Device 101 verifies the security enrollment package contents and determines it is valid, the mobile device 101 preferably generates a public/private key pair and a certificate signing request (CSR).

Mobile Device 101 sends CMP Message 203 to CMF 105. In accordance with an exemplary embodiment, Certificate Management Protocol is the protocol used. Any other suitable protocols can also be used. CMP Message 203 preferably includes a Certificate Request, digitally signed using an OTEC value as an input to the signing process, preferably using an HMAC algorithm. CMP Message 203 also preferably includes a message header that includes an OTEC ID. In accordance with an exemplary embodiment, to provide extra validation and tracking information to CMF 105. Mobile Device 101 includes biometric, location data relating to where the installation is occurring, device ID, or other unique identifying information in the CMP Message 203. This extra data provides additional measures for the CMF 105 to validate the request and also provide more detailed audit trails. For example, when mobile device 101 captures the QR code it could also take a picture of user 103 and encode that into the CMP Message 203. In addition to verifying the CSR, the CMF 105 could then verify the encoded biometric data to ensure that user 103 was authorized to perform the enrollment. This process would be transparent to the user doing the enrollment.

In addition, including biometric or location data in CMP Message 203 to CMF 105 will allow CMF 105 to perform additional validation checks before accepting the request. In the event the request is incorrectly accepted, this additional information can provide good forensic evidence in root causing the problem and removing potential threats.

After validating that CMP Message 203 request is from Mobile Device 101, if CMF 105 determines the request is valid it will get a certificate for Mobile Device 101 based on the request and send CMP Message 205 to Mobile Device 101. If all checks are successful, the CMF creates CMP Message 205. CMP Message 205 is a message that includes a valid certificate for Mobile Device 101. CMF 105 sends CMP Message 205 to Mobile Device 101, and the enrollment and installation process can continue.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for registering a mobile device, the method comprising:
   receiving at the mobile device a machine readable optical label including authentication data and security information, wherein the authentication data comprises a corresponding checksum and the security information comprises location data;
   scanning the machine readable optical label to read the authentication data and the security information;
   validating the authentication data and security information included in the machine readable optical label at the mobile device;
   generating at the mobile device a certificate request, the certificate request digitally signed using the authentication data and the security information;
   transmitting the certificate signing request to a registration authority; and
   receiving, at the mobile device, a digitally signed certificate from the registration authority.

2. The method of claim 1, wherein validating the machine readable optical label comprises validating, at the mobile device, using a checksum.

3. The method of claim 1, wherein validating the machine readable optical label comprises validating, at the mobile device, using an expiration time.

4. The method of claim 1, wherein the machine readable optical label is a QR code.

5. The method of claim 1, wherein the authentication data comprises an identifier.

6. The method of claim 1, wherein the authentication data comprises an expiration time.

7. The method of claim 1, wherein validating the machine readable optical label at the mobile device comprises:
   retrieving, at the mobile device, a current location of the mobile device; and
   validating, at the mobile device, that the current location is within the location data.

8. The method of claim 1, wherein the security information comprises biometric data.

9. The method of claim 8, wherein validating the machine readable optical label at the mobile device comprises:
   retrieving, at the mobile device, user biometric data relating to the user; and
   validating, at the mobile device, that the user biometric data matches the biometric data from the security information.

10. The method of claim 1, wherein the authentication data includes a one time enrollment code (OTEC) value, wherein the certificate request is digitally signed using the OTEC value as an input to a signing process.

11. A mobile device comprising:
    a digital scanner configured to scan a machine readable optical label to read authentication data and security information from the machine readable optical label, wherein the authentication data comprises a corresponding checksum and the security information comprises location data;
    a processor configured to:
      validate the authentication data and security information included in the machine readable optical label;
      generate a certificate request, the certificate request digitally signed using the authentication data and the security information;
    a transmitter configured to transmit the certificate signing request to a registration authority; and
    a receiver configured to receive a digitally signed certificate from the registration authority.

12. The mobile device of claim 11, wherein the machine readable optical label is a QR code.

13. The mobile device of claim 11, wherein validating the machine readable optical label at the processor comprises:
    retrieving, at the mobile device, a current location of the mobile device; and
    validating that the current location is within the location data.

14. The mobile device of claim 11, wherein the security information comprises biometric data.

15. The mobile device of claim 14, wherein validating the machine readable optical label at the mobile device comprises:
    retrieving, at the mobile device, user biometric data relating to the user; and
    validating that the user biometric data matches the biometric data from the security information.

16. The mobile device of claim 11, wherein the authentication data includes a one time enrollment code (OTEC) value, wherein the certificate request is digitally signed using the OTEC value as an input to a signing process.

* * * * *